United States Patent [19]

Bannerman

[11] 4,001,696
[45] Jan. 4, 1977

[54] ELECTRONIC ANTENNA

[76] Inventor: George Louis Bannerman, P.O. Box 577, Sharon, Conn. 06069

[22] Filed: Aug. 2, 1974

[21] Appl. No.: 494,306

[52] U.S. Cl. .............................. 325/373; 325/379; 325/383; 343/713
[51] Int. Cl.² .......................................... H04B 1/18
[58] Field of Search .......... 325/373, 383, 458, 460, 325/461, 462, 384, 459, 315, 379, 376, 381, 374–375; 343/711, 713, 720, 701; 330/31, 177, 178

[56] References Cited

UNITED STATES PATENTS

| 3,217,265 | 11/1965 | Lungo | 330/31 X |
| 3,541,555 | 11/1970 | Willie et al. | 343/720 |
| 3,571,716 | 3/1971 | Hill | 325/383 |
| 3,703,685 | 11/1972 | Simopoulos | 325/381 X |
| 3,801,922 | 4/1974 | Muszkiewicz | 325/459 X |

OTHER PUBLICATIONS

Franklin C. Fitchen, "Transistor Circuit Analysis and Design" 1966, pp. 302–303.
Schilling and Belove, "Electronic Circuits; Discrete and Integrated" 1968, pp. 431–436.

Primary Examiner—Robert L. Griffin
Assistant Examiner—Michael A. Masinick
Attorney, Agent, or Firm—Prutzman, Hayes, Kalb & Chilton

[57] ABSTRACT

An electronic antenna adapted for concealment in an automobile or similar vehicle is tuned by the RF tuning circuits of a conventional radio receiver. In the preferred embodiment, the antenna is designed for the AM and FM broadcast bands and includes a concealed metal plate which may be suitably mounted at a convenient location on the vehicle such as being embedded in the crash panel. RF signals are received by the metal plate pick-up which is connected to both low frequency and high frequency RF amplifiers which amplify them and, after suitable filtering, provide a highly selective output to the conventional radio receiver. This is due to the fact that when the conventional radio receiver is tuned to a station, it presents a very high impedance load at that frequency thereby causing the low frequency or high frequency RF amplifier of the electronic antenna to amplify that frequency in preference to all others.

3 Claims, 5 Drawing Figures

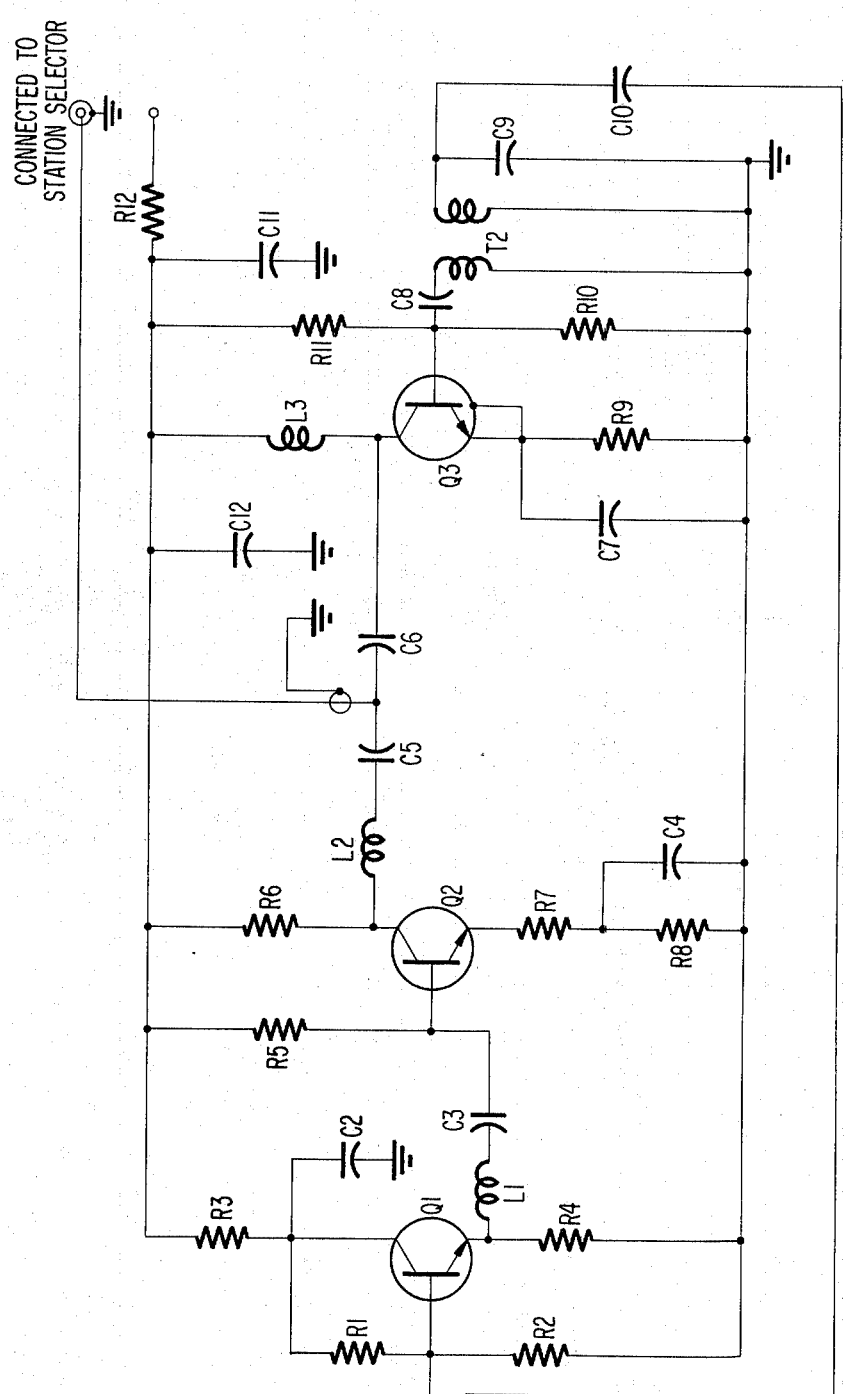
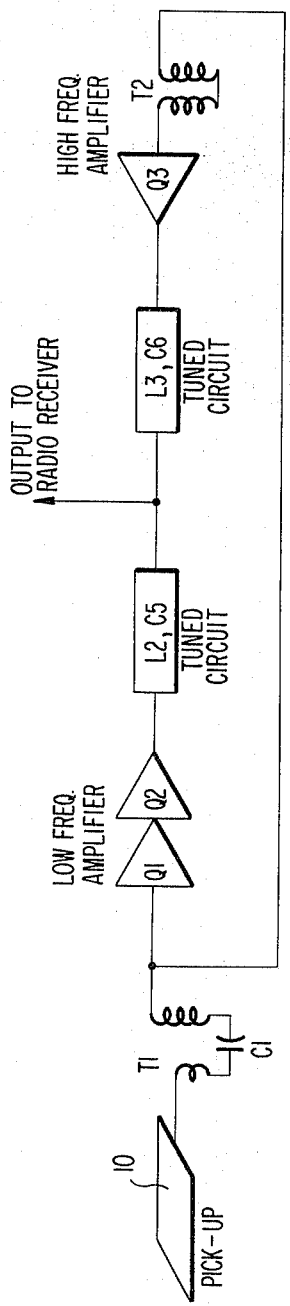
FIG. 1
FIG. 2

ELECTRONIC ANTENNA

BACKGROUND OF THE INVENTION

1. Field of the Invention

The present invention generally relates to antennas, and more particularly to an active electronic antenna which is adapted to be concealed in such applications where concealment is either desirable or necessary such as, for example, in automobiles or other similar vehicles.

2. Description of the Prior Art

There are many applications where a concealed antenna for a radio receiver covering a broad frequency range is highly desirable and sometimes necessary. For example, AM/FM broadcast radio receivers are popular options in automobiles and similar vehicles. These receivers cover a frequency range from 550 KHz to 108 MHz. Electronically, antennas for such a radio receiver have at best been a compromise. Physically, such antennas when mounted on an automobile, for example, are a projection which is both unsightly and a potential safety hazard.

Various attempts have been made in the past to conceal vehicular radio receiver antennas. One technique which has been used with varying degrees of success is to conceal the antenna under a decorative molding on the body of the vehicle. A more recent variation of this technique involves the sandwiching of a very fine antenna wire between the laminated layers of safety glass used, for example, in the windshield of an automobile. While these attempts to conceal the antenna have succeeded in eliminating the physical projection of the antenna from the vehicle, they involve rather expensive modifications to the vehicle itself and make no improvement to the electronic performance of the antenna.

SUMMARY OF THE INVENTION

It is therefore an object of the present invention to provide a radio antenna which is adapted to be readily and inexpensively concealed.

It is another object of the invention to provide an antenna for a vehicular radio receiver, which antenna may be conveniently mounted on the vehicle without special modification to the vehicle or, alternatively, made an integral part of the vehicular radio receiver.

It is a further and more specific object of the instant invention to provide a concealable active electronic antenna designed to receive low-level electro magnetic signals, amplify them and, after suitable filtering, provide a highly selective output to conventional AM/FM radio broadcast receivers covering the frequency range from 550 KHz to 108 MHz.

According to the present invention, the foregoing and other objects are attained by providing a concealable metal plate which picks up the signal and delivers it to an inherently broad band RF pre-amplifier which is tuned by the station selector of the radio receiver. The RF pre-amplifier includes both a low frequency amplifier for the AM broadcast band and a high frequency amplifier for the FM broadcast band. The output of the RF pre-amplifier is connected to the input of the RF tuning section or station selector in the radio receiver. The RF tuning circuit serves as the load circuit for the antenna, and the tuning of the RF tuning circuit in the radio receiver also tunes the electronic antenna. Thus, the antenna has the advantage of not only being concealable but also being tunable to provide a highly selective output to the radio receiver.

BRIEF DESCRIPTION OF THE DRAWINGS

The specific nature of the invention, as well as other objects, aspects, uses and advantages thereof, will clearly appear from the following description and from the accompanying drawings, in which:

FIG. 1 is a block diagram illustrating a preferred embodiment of the invention;

FIG. 2 is a schematic diagram illustrating a specific implementation of the preferred embodiment illustrated in FIG. 1;

DESCRIPTION OF THE PREFERRED EMBODIMENT

Figure 3A:
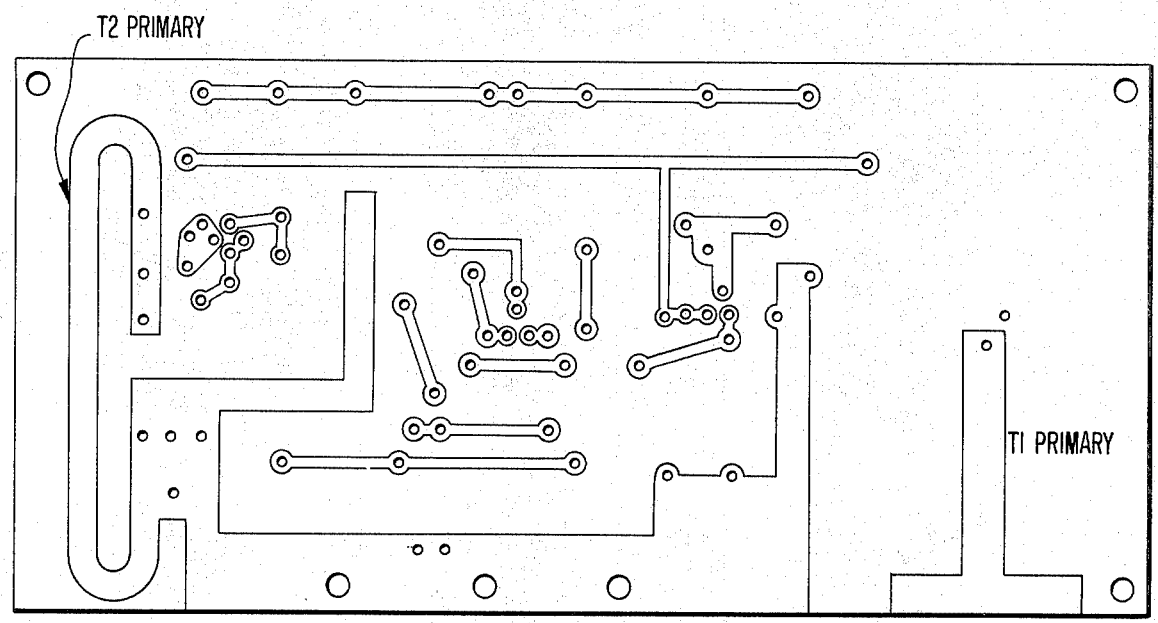
FIGS. 3A and 3B are, respectively, front and back views of a printed circuit board on which the circuit shown in FIG. 2 may be constructed.

Referring now to the drawings, the invention will be described with respect to a specific, preferred embodiment. It will be understood by those skilled in the art, however, that the embodiment disclosed is exemplary and that the invention may be practiced in other and different embodiments. Referring more particularly to FIG. 1, there is shown a block diagram of the active electronic antenna which includes a concealed metal plate or pick-up 10. The pick-up 10 may, for example, be concealed in the crash panel of an automobile. The overall antenna is omnidirectional by design, but the addition of a housing having a rounded shape may be employed to improve the omnidirectional feature.

An input transformer T1 is connected at one end of its primary winding to the pick-up 10. A capacitor C1 connects the other end of the primary winding to one end of the secondary winding of transformer T1 to provide a broad band tuned circuit. Input transformer T1 steps up the received signals at the output of the secondary winding. The other end of the secondary winding of transformer T1 is connected to the input of a low-frequency amplifier which comprises two transistor stages Q1 and Q2 connected in cascade. The output of the low-frequency amplifier is connected by means of a tuned circuit L2 and C5 to the radio receiver RF tuning circuit.

The secondary winding of input transformer T1 is also connected to the primary winding of a double-tuned transformer T2. The secondary winding of transformer T2 is connected to a high-frequency amplifier which comprises a single transistor state Q3. The output of the high-frequency amplifier is connected by means of a second tuned circuit L3 and C6 to the radio receiver RF tuning curcuit.

Where the electronic antenna is made as a separate sub-assembly for remote mounting, the tuned circuits for both the low-frequency and high-frequency amplifiers are most conveniently connected to the RF tuning circuits of the radio receiver by means of a single coaxial cable, the connection being made at the usual antenna input jack. Where a coaxial cable connection is used, the capacitance of the cable is considered a part of each of the tuned circuits for the low and high frequency amplifiers of the electronic antenna.

FIG. 2 shows a schematic diagram of a specific active electronic antenna according to the invention. The pick-up 10 is shown connected directly to the primary of the input transformer T1 as in FIG. 1, but it will be understood that the metal plate which comprises the pick-up 10 and the low and high frequency amplifiers may be constructed as two or more sub-assemblies, in which case a suitable connection would be provided between the pick-up 10 and the primary winding of input transformer T1. The secondary winding of transformer T1 is connected to the base of transistor Q1. Transistor Q1 is a high-gain, low-noise type operating as a grounded stage which provides power gain and features high input impedance and low output impedance. Resistors R1, R2 and R3 form a voltage divider and supply base bias current. DC feedback is derived from the voltage drop across collector resistor R3 and the collector to base resistor R1. This stabilizes the bias against variations in supply voltage and temperature. This also protects transistor Q1 against excessively strong input signals. The emitter load resistor R4 has a high value which provides more DC stability. The collector of transistor Q1 is grounded at radio frequencies by capacitor C2.

A high impedance coupling circuit comprising inductor L1 and capacitor C3 connected in series, connects the output of transistor Q1 to the base of transistor Q2. DC is blocked by capacitor C3. Transistor Q2 is a medium gain, medium power type operating as a common emitter stage to provide voltage amplification. Base bias current is supplied through resistor R5. The combination of resistors R7 and R8 anc capacitor C4 in the emitter circuit of transistor Q2 stabilizes the DC bias and is a high-pass filter that attenuates frequencies below 550 KHz. This low frequency response is determined by the values of resistor R7 and capacitor C4.

The low frequency amplifier output appears across the load resistor R6. Inductance L2 and capacitor C5 along with the distributed capacitance of any output cable are a series tuned circuit. When the radio receiver is tuned to a station, it presents a high impedance load at that frequency. This causes the output stage transistor Q2 to selectively amplify that frequency in preference to all others. All other signals are attenuated.

The VHF signals are coupled from the secondary of input transformer T1 to the double tuned transformer T2, through series blocking capacitor C10. Capacitor C9 connected across the primary of transformer T2 tunes transformer T2 to the VHF band. VHF signals are coupled to the base of high frequency amplifier transistor Q3 through capacitor C8. Transistor Q3 is a very high cutoff frequency, low noise type connected as a common emitter amplifier. Base bias current is established by the voltage divider comprising resistors R10 and R11. The emitter circuit comprising resistor R9 and capacitor C7 connected in parallel stabilizes the DC bias and is a low frequency attenuator.

The common emitter stage Q3 has as a load inductor L3 capacitor C6, cable capacitance (if any) and the radio receiver input. High selectivity is provided by the radio receiver input offering a high impedance to inductor L3, capacitor C6 and transistor Q3 at the tuned signal frequency.

DC power is supplied externally. The antenna preamplifier operates from a low voltage, low current drain positive polarity source such as a 12-volt automobile battery. DC supply voltage is filtered by resistor R12 and capacitors C11 and C12 acting as a low-pass filter that eliminates unwanted signals.

Figure 3B:
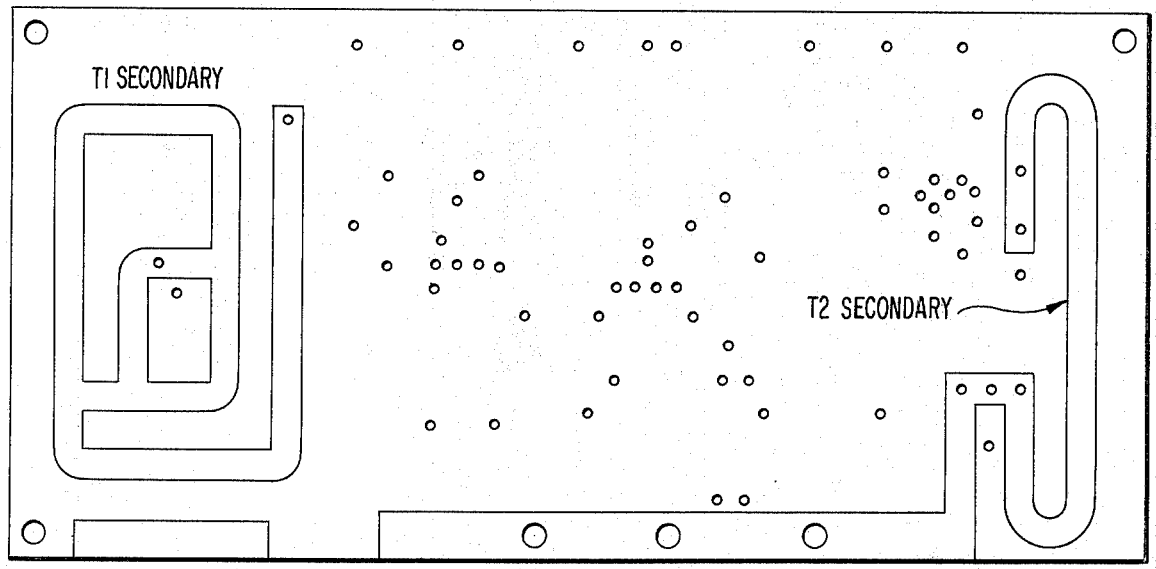

FIGS. 3A and 3B show the front and back views, respectively, of a printed circuit board on which the pre-amplifier of the electronic antenna shown schematically in FIG. 2 may be constructed as a sub-assembly separate from the pick-up 10. Note that the input transformer T1 and the VHF double tuned transformer T2 are, in the preferred embodiment, constructed as printed circuits on the printed circuit board. More specifically, in FIG. 3A, the primaries of transformers T2 and T1 are shown at the left and right portions, respectively, of the top of the printed circuit board. In FIG. 3B the secondaries of transformers T1 and T2 are shown in the left and right portions, respectively, of the bottom of the printed circuit board.

Figure 4:
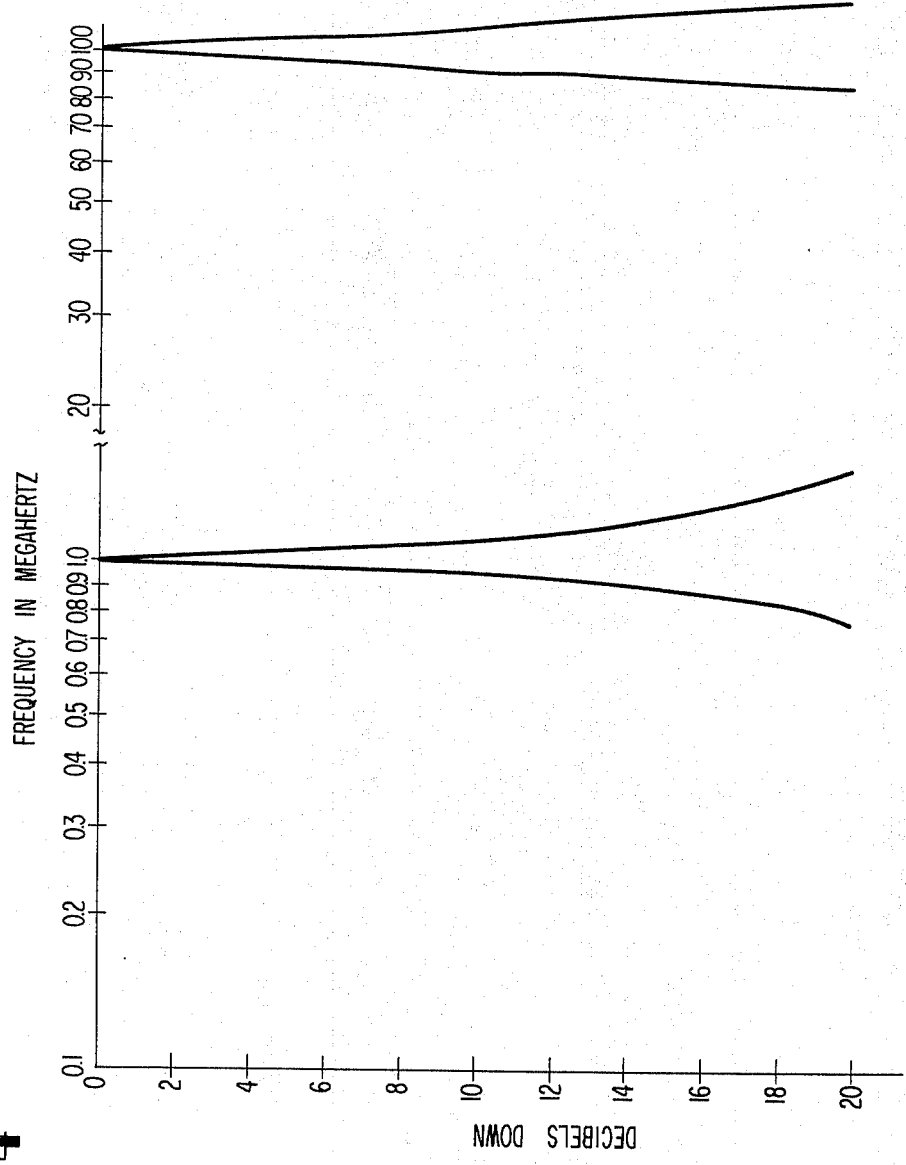
FIG. 4 is a graph showing the response curves of the circuit shown in FIG. 2 at test frequencies of 1 and 100 MHz.

The operation of the electronic antenna according to the invention is quite remarkable for its highly selective output characteristic. FIG. 4 shows graphically test data taken from a test of the circuit shown in FIG. 2. Only two curves are shown because these demonstrate the shape of all the curves within the pass band of the electronic antenna. In the test procedure, the output of an RF signal generator was loosely coupled to the pick-up 10 and the output of the antenna to the radio receiver was measured. The radio receiver was tuned to 1 MHz on the AM dial and then to 100 MHz on the FM dial. In each test, the RF signal generator frequency was first set to the radio receiver frequency, and the output was measured with the RF signal generator input set to provide an output measurement of 0dB. The frequency of the RF signal generator was then decreased in increments to reach the −20dB point. This procedure was repeated for frequency increments above the mean frequency to obtain the −20dB point on the high frequency side.

It will be apparent that the embodiment shown is only exemplary and that various modifications can be made in construction and arrangement within the scope of the invention as is found in the appended claims.

I claim:

1. An electronic antenna adapted to be used wth the conventional radio receiver having at least one tunable RF circuit, said antenna being tuned by said tunable RF circuit, and comprising:
    a concealable electromagnetic pick-up,
    an input transformer having primary and secondary windings, said pick-up being connected to said primary winding of said input transformer, and
    broad band RF pre-amplifier means having an input coupled to said secondary winding of said input transformer and an output coupled to said tunable RF circuit in said conventional radio receiver as a load for selectively amplifying only the frequencies to which said tunable RF circuit is tuned,
    said conventional radio receiver being tunable over at least two different broadcast bands and including a separate tunable RF circuit for each broadcast band, said broad band RF pre-amplifier means comprising:
    first pre-amplifier means directly connected to said secondary winding of said input transformer for amplifying signals in a first of said broadcast bands,
    a first tuned circuit connected between the output of said first pre-amplifier means and the tunable RF circuit for the first broadcast band in said conventional radio receiver,
    second pre-amplifier means coupled to said secondary winding of said input transformer for amplifying signals in a second of said broadcast bands, and a second tuned circuit connected between the output of said second pre-amplifier means and the tunable RF circuit for the second broadcast band in said conventional radio receiver, and said at least two broadcast bands being the AM and FM broadcast bands, respectively, and said first preamplifier means comprises:

a first transistor having a base, a collector and an emitter, said base being directly connected to said secondary winding of said input transformer, said first transistor being connected as a grounded collector stage, a second transistor having a base, a collector, and an emitter, said second transistor being connected as a common emitter stage, a high impedance coupling circuit including an inductor and a capacitor connected in series between the emitter of said first transistor and the base of said second transistor, and a high-pass filter connected in the emitter circuit of said second transistor to attenuate frequencies below said AM broadcast band.

2. An electronic antenna as recited in claim 1 wherein said second pre-amplifier means comprises:

a second double-tuned transformer tuned to said FM broadcast band, said second transformer having primary and secondary windings, said primary winding of said second transformer being coupled to said secondary winding of said first transformer, a third transistor having a base, a collector and an emitter, said base of said third transistor being coupled to said secondary winding of said second transformer, said third transistor being connected as a common emitter stage, and a low frequency attenuator connected in the emitter circuit of said third transistor to attenuate frequencies below said FM broadcast band.

3. An electronic antenna as recited in claim 2 wherein said first and second transformers are printed circuit transformers, comprising a printed circuit substrate having first and second planes, said primary and secondary windings being printed on said first and second planes opposite to one another.

* * * * *